United States Patent
Dunn

(10) Patent No.: US 6,402,498 B1
(45) Date of Patent: Jun. 11, 2002

(54) BRISTLE AND BRISTLE SUPPORT SURFACE PRODUCING MACHINE

(76) Inventor: Gary D. Dunn, 2368 Podocarpus Way, Clearwater, FL (US) 33759

( * ) Notice: Subject to any disclaimer, the term of this patent is extended or adjusted under 35 U.S.C. 154(b) by 0 days.

(21) Appl. No.: 09/325,710

(22) Filed: Jun. 4, 1999

(51) Int. Cl.⁷ .............................. A46D 3/00; B29C 39/02
(52) U.S. Cl. ...................... 425/224; 425/374; 425/471; 425/805
(58) Field of Search .................... 425/805, 363, 425/308, 374, 222, 224, 471; 264/148

(56) References Cited

U.S. PATENT DOCUMENTS

| | | | | |
|---|---|---|---|---|
| 3,098,262 A | * | 7/1963 | Wisotzky | 264/74 |
| 3,312,583 A | * | 4/1967 | Rochlis | 425/805 |
| 3,590,103 A | * | 6/1971 | Doleman et al. | 425/805 |
| 5,107,562 A | | 4/1992 | Dunn | 15/167.1 |
| 5,108,814 A | | 4/1992 | Harp et al. | 264/214 |
| 5,376,203 A | | 12/1994 | Syme | 264/284 |
| 5,458,477 A | * | 10/1995 | Kemer et al. | 425/371 |
| 5,476,563 A | | 12/1995 | Nakata | 264/284 |
| 5,554,333 A | | 9/1996 | Fujiki | 425/385 |
| 5,688,538 A | | 11/1997 | Barr et al. | 425/363 |
| 5,728,408 A | | 3/1998 | Boucherie | 425/116 |
| 5,792,408 A | | 8/1998 | Akeno et al. | 264/284 |

* cited by examiner

*Primary Examiner*—Nam Nguyen
*Assistant Examiner*—Thu Khanh T. Nguyen
(74) *Attorney, Agent, or Firm*—Siemens Patent Services, LC

(57) ABSTRACT

A machine and method for producing bristles and a support surface for the bristles, are disclosed. An extruder feeds material from a supply source to an extrusion die and a forming die. The circumferential surface of the drum includes a plurality of recesses in the desired shapes and patterns for forming the bristles. In addition, a wide shallow groove in the extrusion die is formed in the desired shape of the bristle support surface. As the fluid material is extruded between the extrusion die and the forming die, the material fills the recesses in the drum that are facing the extrusion die as well as the groove in the extrusion die. The drum rotates to expose empty recesses and to rotate the filled recesses and material in the groove away from the extrusion die. As the fluid material is rotated away from the extrusion die, it cools and solidifies. Pressurized air is used to aid in cooling and to help release the bristles from the recesses in the drum, as drive wheels grip the support surface and feed the finished product to further manufacturing processes. The extrusion and forming dies can be exchanged to produce whatever pattern and bristle shape is most suitable to the type of brush being manufactured.

6 Claims, 4 Drawing Sheets

BRISTLE AND BRISTLE SUPPORT SURFACE PRODUCING MACHINE

BACKGROUND OF THE INVENTION

1. Field of the Invention

The present invention relates generally to cleaning and manufacturing. More specifically, the invention comprises bristle manufacturing. In particular, the invention provides a unique apparatus for forming bristles on a thin, pliable, substrate base or surface. Such bristles are envisioned as ideal for use on a finger mounted toothbrush.

In general, a first field of use of the disclosed invention is by professional and non-professional cleaning personnel. However, many other fields such as dental, medical, industrial manufacturing, transportation and home construction, could find potential uses for this invention.

2. Description of the Prior Art

There are a myriad of brushing devices currently on the market, including but not limited to hand brooms, industrial brooms, hand brushes, toothbrushes, floor polishers, automobile polishers, etc. In many of these brushing devices, individual strands or tufts of bristles are later attached to a separate rigid support surface. In prior manufacturing techniques, the synthetic resin bristles are first extruded (or natural hair bristles are used) and then glued or injection molded to a support surface such as a handle. These techniques are slow and costly, requiring placing the bristles in a specific location prior to filling a mold. The present invention overcomes these disadvantages by molding the bristles in-situ with a flexible support surface. In addition the present method is not only faster and therefore more economical, but also more accurate in that individual bristles are produced independently, and can be arranged in varying patterns, sizes, densities and heights. This results in a sculpted brushing surface that may be very complex in shape while being reproducible accurately and quickly.

My prior U.S. Pat. No. 5,107,562 issued to Dunn on Apr. 28, 1992 discloses a disposable finger-mounted toothbrush with holding means. The actual method of making this finger-mounted brush is not disclosed, and this patent is shown simply to illustrate one of the more beneficial areas of use for the method of the present invention. While finger-mounted toothbrushes have been known, the present method of attaching bristles to a thin surface is the only economically practical way known to the inventor to manufacture these type of brushes.

U.S. Pat. No. 5,108,814, issued to Harp et al. on Apr. 28, 1992, is directed to embossed oriented film. A thermoplastic film is introduced between a pair of rotating compression rolls using sufficient pressure to emboss at least one of the film surfaces. The method discussed is related to embossing as opposed to molding, and is incapable of producing bristle type appendages suitable for a brushing device.

A rotary molding apparatus and method is disclosed in U.S. Pat. No. 5,376,203, issued to Syme on Dec. 27, 1994. This method molds foam materials for use as carpet under padding. A sheet of a foamed material is pulled through a first set of rollers at a first rate followed by heating the material to decompose blowing agents thereby expanding the sheet. A second set of rollers then pulls the sheet at a second faster rate to stretch the expanded sheet so that it returns to its original thickness. Dimples or indentations on one of the rolls produces protrusions on one side of the sheet. As with the Harp et al. invention, this method is more closely related to embossing and is incapable of producing bristle type appendages suitable for brushing.

U.S. Pat. No. 5,476,563, issued to Nakata on Dec. 19, 1995 discusses a process of making a door mat. In the method, a large number of synthetic resin monofilaments are extruded between a first molding roller having concave grooves and a pattern forming roller having convex strips. This method produces a door mat with a surface layer and a reverse anti-slip surface layer formed by a large number of random, looped, synthetic resin monofilaments. This method does not actually produce the filaments and is incapable of producing non-looped bristle type appendages.

An apparatus and method for producing floor mats carrying flat tipped projections are shown in U.S. Pat. No. 5,554,333, issued to Fujiki on Sep. 10, 1996. A molding resin material is passed between a press roll and a mold roll. The mold roll is hollow and includes a number of through holes and an air venting means in the interior thereof. The through holes are filled with the resin material thereby forming the projections. The resulting floor mats, however, have projections that are relatively large and frustoconical in shape, making them impractical for use in brushing devices.

U.S. Pat. No. 5,688,538, issued to Barr et al. on Nov. 18, 1997 discloses an apparatus for three dimensional surface shaping of synthetic foam. The foam is compressed between a pattern roller and a smooth compression roller and is driven against a cutting edge. This results in a three dimensional pattern of arbitrary geometries including sharp edged flat surfaced geometric solids being produced on the foam surface. The apparatus is not suitable for producing relatively narrow projections such as bristles.

A molding apparatus with a tuft feeder for making a brush is described in U.S. Pat. No. 5,728,408 issued to Boucherie on Mar. 17, 1998. The machine feeds preconstructed bristles to an injection mold for forming a brush head about tufts of the bristles. The method of making the bristles is not disclosed.

U.S. Pat. No. 5,792,408, issued to Akeno et al. on Aug. 11, 1998 is drawn to a molded surface fastener, and method and apparatus for manufacturing the same. In FIG. 14 a die wheel is shown with a multiplicity of engaging-element-forming cavities. Material is fed via an injection nozzle and fills the cavities. The engaging elements are then fed to heating and pressing means to finish forming the engaging elements. The engaging elements are designed to be engaged by loops in the mating fastener material, and as such are not suitable as brush bristles.

None of the above inventions and patents, taken either singly or in combination, is seen to describe the instant invention as claimed.

SUMMARY OF THE INVENTION

The present invention includes a machine for producing bristles and a support surface for the bristles, the method by which the bristles and the support surface are produced and the bristles and support surface so produced. An extruder (or any device appropriate for pumping, forcing or otherwise feeding the type of material being used) feeds the material used to form the bristles and the support surface, from a supply source to an extrusion die. The material used can be any number of synthetic resins, plastics, etc. with varying densities and colors. A forming die in the shape of a drum is rotatably mounted proximate the extrusion die. The circumferential surface of the drum includes a plurality of recesses in the desired shapes and patterns. As the fluid material is extruded between the extrusion die and the forming die, the material fills the recesses in the drum that are facing the extrusion die. While the forming die disclosed herein is embodied as a rotating drum, other types of forming dies are envisioned such as a linearly moving plate or platen that includes recesses that are filled by the extruder.

While the material fills the recesses facing the extrusion die, the drum rotates to expose empty recesses and the filled recesses are rotated away from the extrusion die. In addition to filling the recesses, the fluid material fills a void formed by a wide shallow groove in the extrusion die. The depth of this groove thereby determines the thickness of the bristle support surface that is formed in-situ with the bristles. In the preferred embodiment, the groove is relatively shallow and a thin strip of material is formed as the support surface. The groove is also preferably wider than the distance between the outermost recesses, so that a portion of the flat support surface extends to either side of the bristles. This portion is useful both for attaching the bristles to other surfaces, as well as for handling the product in subsequent operations as is discussed below. Depending on the size and shape of the groove and recesses, the machine may have to index by stopping or changing the speed the drum or die as it passes the extrusion die to fill different areas at varying rates.

As the filled recesses are rotated away from the extrusion die, the material in the recesses cools and solidifies. Pressurized air is directed at a point where the bristles are released from the recesses in the drum. The pressurized air aids in this release as well as further cooling the material. Alternatively, other methods of assisting in the removal of the material may be used such as incorporating vents at the ends of the recesses. The vents would allow air to escape as material fills the recesses, and pressurized air or fluid could be forced through the vents to remove and cool the solidified material. Two pairs of drive wheels (one pair for each side) grip the support surface that extends on either side of the outermost bristles (as described above) to feed the finished product to further manufacturing processes such as cutting, attachment to brushing devices, etc. These further processes are well known industrial processes and shall therefore not be further described.

A significant advantage of the present invention, is the ease with which the extrusion die and the forming die or drum can be replaced. Dies of different thickness can be used for different widths of the finished brushing device. Forming dies can be contemplated having recesses in a wide variety of shapes, sizes, patterns, densities, etc., to produce whatever pattern and bristle shape is most suitable to the type of brush being manufactured. In addition to bristles, the recesses may be continuous straight or tortuous grooves for forming projections that can be used in squeegees, wiper blades, weather stripping, or other applications.

Accordingly, it is the primary object of the invention to provide an apparatus and method for producing bristles in-situ on a bristle support surface.

Another object of the invention is to provide a relatively thin bristle support surface with bristles thereon for attachment to a brushing device.

An additional object of the invention is to minimize complexity, cost and time required to fabricate a myriad of brushing devices.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
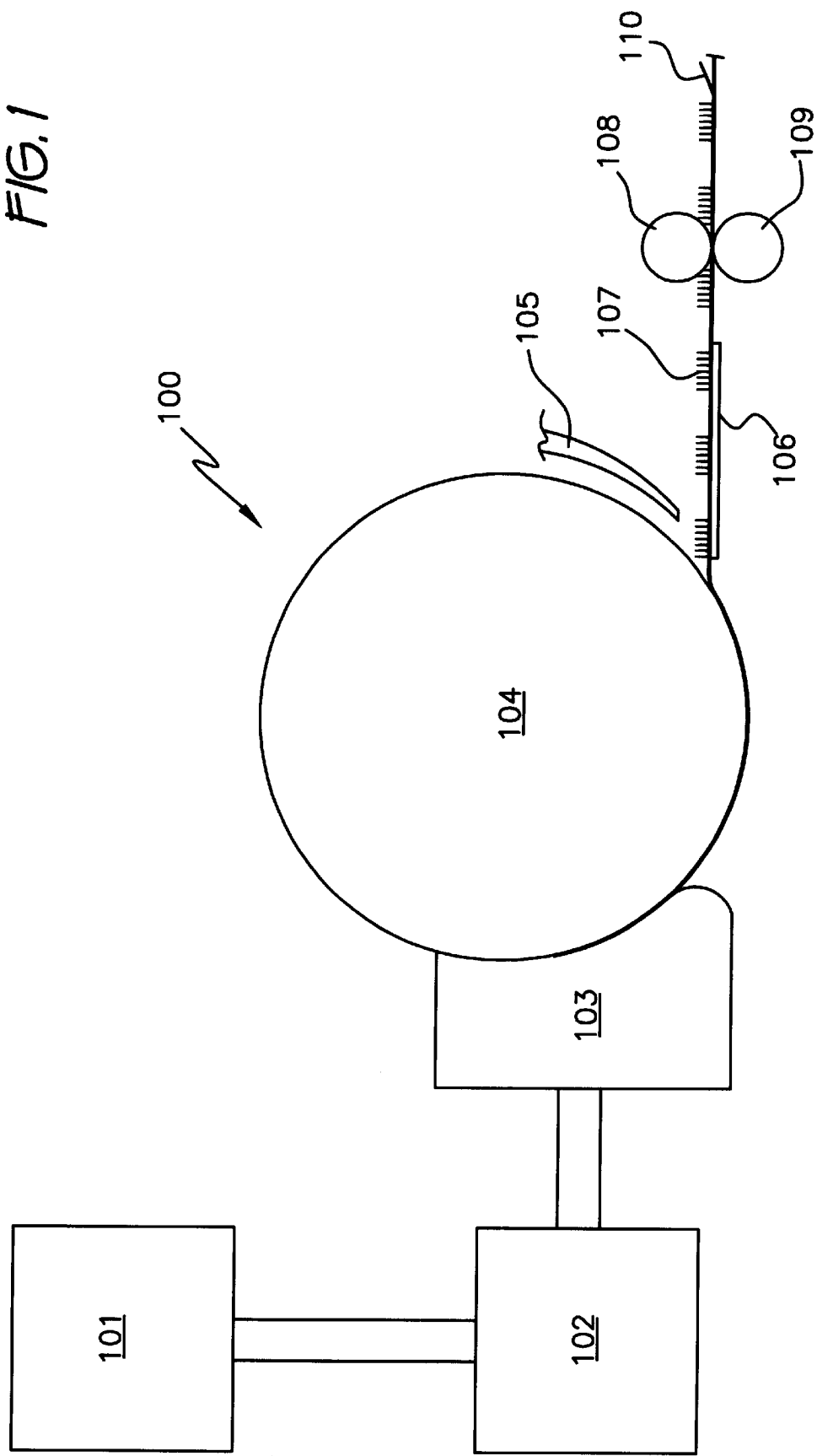
FIG. 1 is a schematic diagram of the bristle producing machine of the present invention.

Turning first to FIG. 1, the present invention is generally indicated at 100. A material supply source 101 stores the material used to form the bristles (preferably low density polyethylene foam, LDPE). An extruder 102 feeds the material to an extrusion die 103 that in turn dispenses the fluid material between the extrusion die 103 and a forming die 104. The material fills recesses in the forming die 104 and a groove in the extrusion die 103, to form the finished product. The forming die 104 is in the form of a rotatably mounted drum. As the drum rotates, the material cools and solidifies. Pressurized air is provided via a flexible air supply 105 and is directed to a location where the finished product 107 is removed from the forming die 104. The pressurized air cools the material further, as well as assisting in the finished product's removal from the die 104. Drive wheels 108 and 109 feed the product 107 to the next manufacturing station (shown here as a cutting knife 110 for removing the bristles from the support surface) for subsequent operations. A guide 106 is provided to maintain the product 107 in correct alignment with the die 104 and drive wheels 108 and 109.

Figure 2:
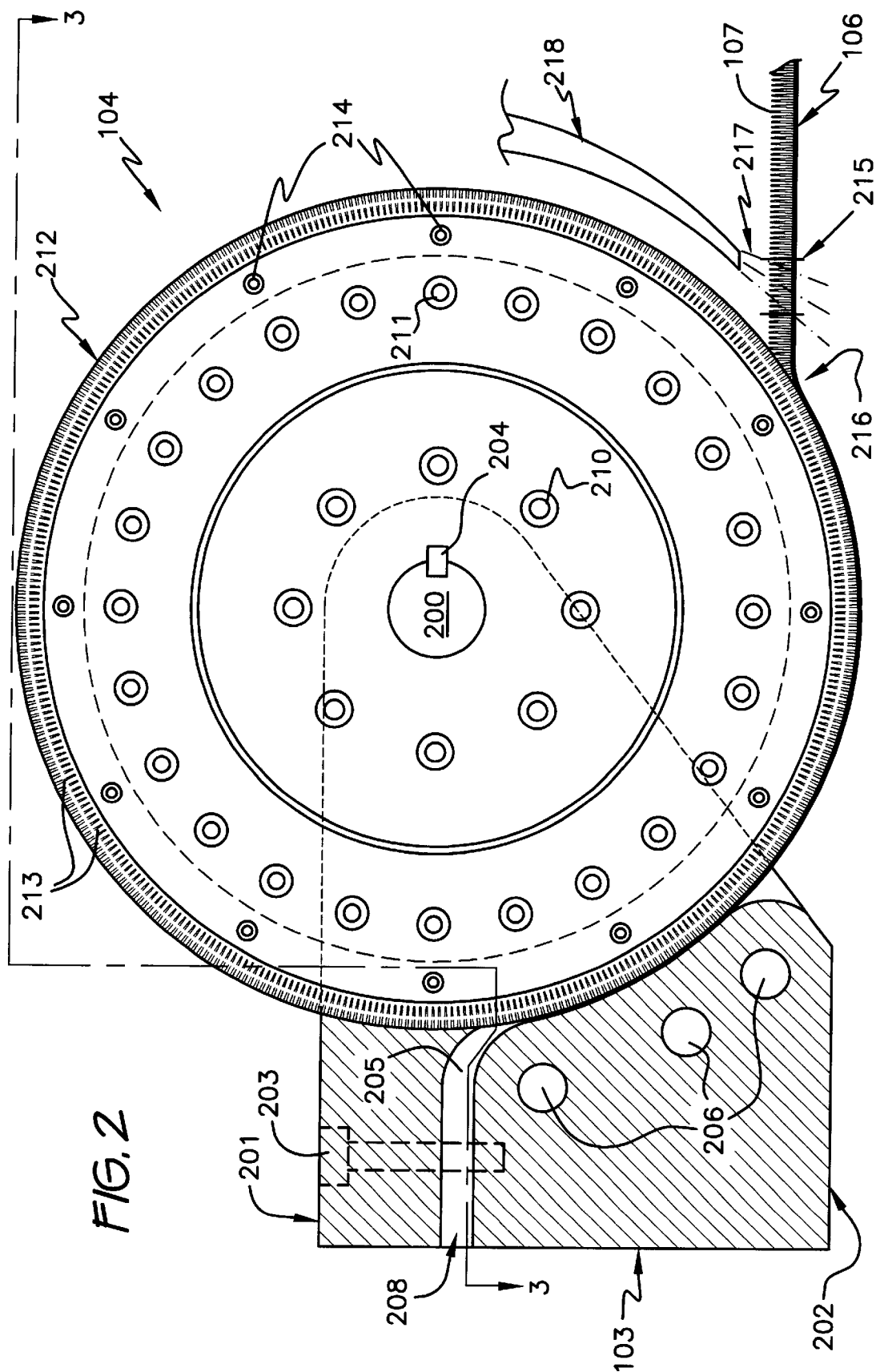
FIG. 2 is an side plan view of the extrusion die and the forming die of the machine of FIG. 1.
Figure 3:
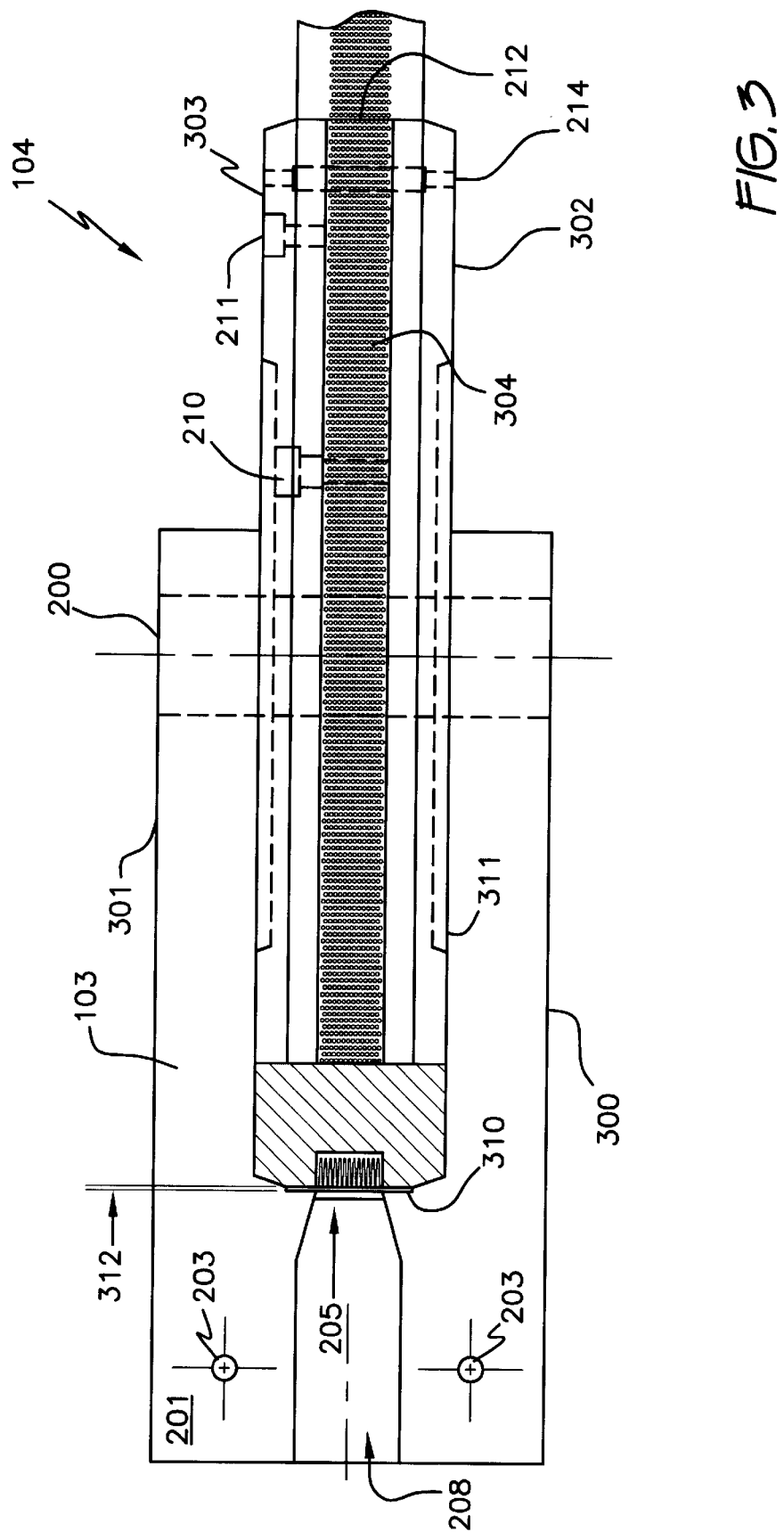
FIG. 3 is a top view of the extrusion die and the forming die of the machine of FIG. 1.

FIGS. 2 and 3 show the details of the construction of the extrusion die 103 and forming die 104. The extrusion die 103 is formed in two parts: a top portion 201; and a bottom portion 202. Two bolts 203 extend through countersunk bores in the top portion 201 and into blind, threaded bores in the bottom portion 202, to hold the top and bottom portions together. A shaft 200 extends through a bore from a first side 300 of the extrusion die 103 to a second side 301 of the extrusion die 103, and is keyed to the extrusion die 103 using key 204. An intake port 208 is provided in the extrusion die 103 to receive fluid material fed by the extruder 102. The intake port 208 extends into the extrusion die 103 and ends in a nozzle 205. The bottom portion 202 of the extrusion die 103 includes a wide groove 310 for forming the bristle support surface as further explained below. Three through bores 206 are provided in the bottom portion 202 of the extrusion die 103 for accepting bolts to support the extrusion die 103.

The forming die 104 is shaped as a drum or wheel and is rotatably mounted on shaft 200 using suitable bearings or bushings. The drum 104 rotates in a large slot 311 formed in both the top and bottom portion of the extrusion die 103 and at a right angle to the shaft 200, and is comprised of three sections: a first outer section 302; a second outer section 303; and a die section 304 sandwiched there between. A plurality of inner 210 and outer 211 bolts extend through countersunk bores in the outer sections 302 and 303 and into blind, threaded bores in the die section 304, to hold the three sections together. Both the inner and outer bolts are arranged in equally spaced circular configurations, with adjacent bolts extending into the die section 304 from opposite directions. This configuration provides great strength while allowing the die section 304 to be replaced with different die sections for producing different bristle diameters, lengths, shapes, patterns and pattern sizes. A number of coolant bores 214 are arranged around the periphery of the drum 104. Air, water or other suitable coolant may be directed through these bores 214 to provide additional cooling as needed. The outer circumferential surface 212 of the die section 304, includes a plurality of recesses 213 that are filled with the fluid material for forming the bristles. The pattern illustrated by recesses 213 is for continuous bristle production, (useful, for example, when the cutting knife 110 is used to form bristles only) although as previously discussed, these recesses can be arranged to produce a myriad of bristle patterns and groupings.

Fluid material enters the intake port 208 and is fed to the nozzle 205. Nozzle 205 dispenses the material into groove 310 and the recesses 213. The rate of dispensing and the rotational speed of the forming die 104 are calibrated to each other, such that the entire groove 310 as well as the entire volume of all the recesses 213 are filled with material, without fluid material backing up in the machine. As the filled recesses and filled areas of the groove 310 rotate toward point 216 in FIG. 2, the material in the recesses and the groove cools and solidifies. A channel-shaped guide 106 is provided to keep the finished product 107 aligned with the machine as it exits the forming die 104 at point 216. For additional cooling, and as an aid in removing the finished product 107 from the forming die 104, a stream of pressurized air 217 is directed at the point 216 the finished product 107 leaves the forming die 104. The pressurized air can be supplied by a flexible air hose 218, or other suitable means.

Figure 4:
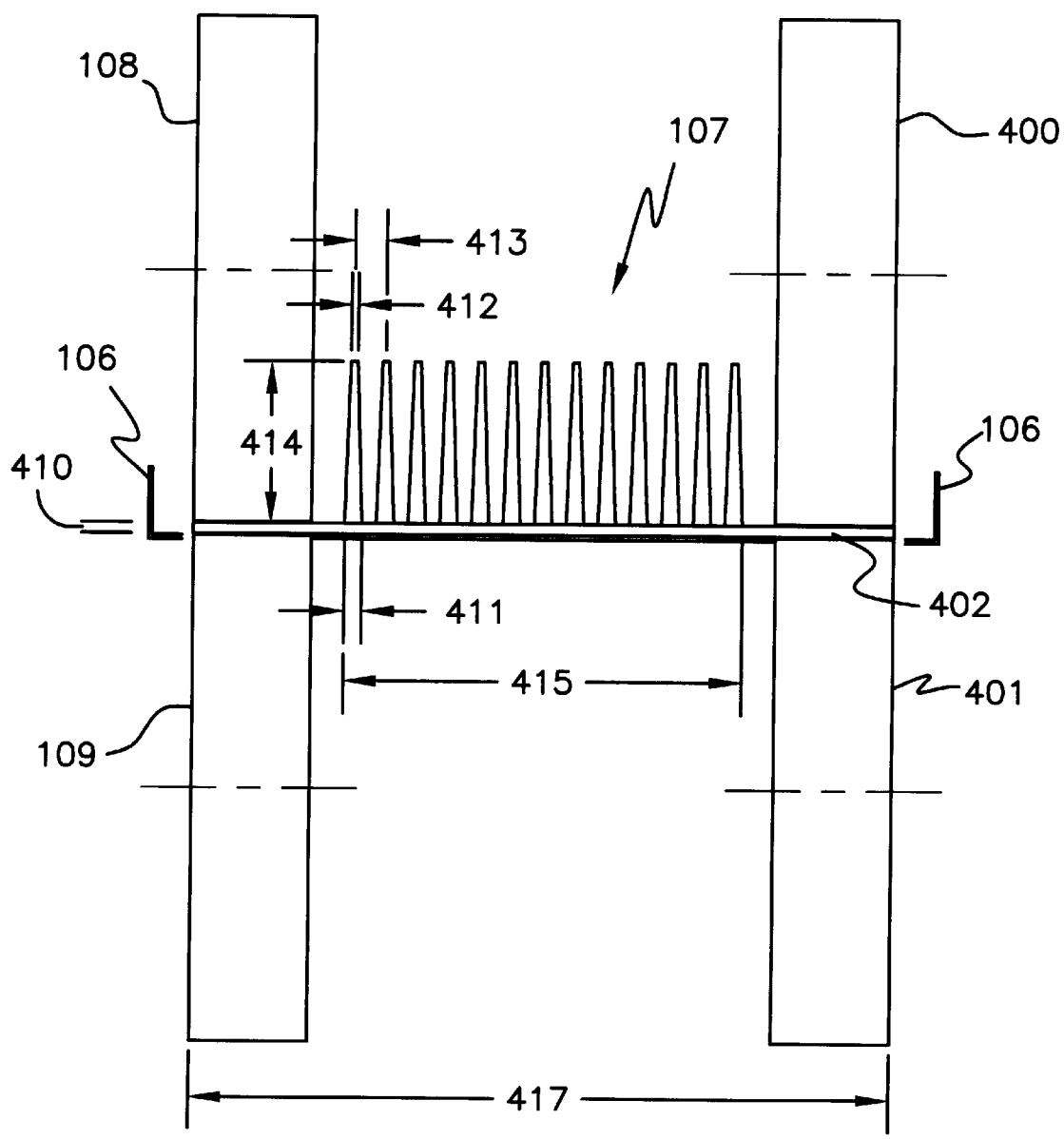
FIG. 4 is an enlarged end view showing details of the drive wheels and the finished product.

FIG. 4 shows the details of the drive wheels and the finished product. A first pair of upper 108 and lower 109 drive wheels are shown here as well as in FIG. 1. A second pair of drive wheels, also includes an upper 400 and a lower 401 drive wheel. Each pair of drive wheels grip the support surface 402 of the finished product 107 that extends on either side of the outermost bristles. The drive wheels feed the finished product 107 to further manufacturing processes such as the previously discussed cutting station or knife 110 to remove the bristles from the support surface, when it is desired to produce bristles only. Alternatively, the cutting station may be designed to cut the support surface into prearranged sizes for application to a brushing device.

Referring back to all the figures, the relationship between the finished product 107 (best seen in FIG. 4) and the dies 103 and 104 shall now be discussed. The thickness 410 of the bristle support surface 402 is determined by the depth 312 of the groove 310 in the extrusion die 103. The bristle base diameter 411 and bristle tip diameter 412, as well as the space between bristles 413 and bristle length 414 are all determined by the same distances (inverted) in the recesses 213 in the outer circumferential surface 212 of the die section 304. In addition, as the entire dies 103 and 104 can be replaced, extensive widths 417, depths 414 and lengths (215 in FIG. 2 as determined in a subsequent cutting process) can be achieved.

One particularly well suited application for the present invention is the present inventor's own finger mounted toothbrush as described in U.S. Pat. No. 5,107,562 above. A preferred grouping of bristles for this application could have 0.150" length 414, 0.020" diameter bristle bases 411, tapering to 0.010" diameter bristle tips 412, 0.035" spacing between bristles 413 and an oval arrangement of bristles 0.500" wide 415 by 0.750" long (215 in FIG. 2). In this application, a suitable support surface thickness 410 might be 0.015", with a width 415 of 0.875" and an overall length 215 of 1.125 ".

Another well suited application of the present invention is the production of surgical scrub brushes. A surgical scrub brush is a one piece brush with a substantially flat, flexible main body (approximately 3.00" by 5.00") having a large number of short (0.188") bristles standing upright therefrom. A relatively wide extrusion die 103 and forming die 104 could be used to achieve these dimensions using the present invention.

In any application, a major advantage of the present invention is the ability to rapidly produce appendages that are suitable for use as bristles, and to produce these bristles in-situ with a support surface. The simultaneous production of both the bristles and the support surface not only results in a quality finished product, but also aids in manufacturing by providing a suitable surface which can be used to handle the product. To increase the usefulness of the invention, several modifications can be incorporated. For example, multiple extrusion dies and drums or platens can be attached side-by-side on the same machine to simultaneously make different products. Further, the drive wheels may have holes, protrusions or embossing, to increase traction between the wheels and the product and/or to form holes or protrusions on the support surface.

It is to be understood that the present invention is not limited to the embodiments described above, but encompasses any and all embodiments within the scope of the following claims.

I claim:

1. A machine for producing bristles and a support surface for the bristles, said machine comprising:

an extrusion die for receiving fluid material, said extrusion die having an intake port, a nozzle, a large slot, a large bore formed in said extrusion die at a right angle to said large slot and having a shaft extending therethrough, said large slot having a groove therein; and a generally cylindrical forming die rotatably mounted on said shaft and disposed within said groove, a circumferential outer surface of said forming die presenting an exposed surface with a plurality of recesses formed therein; wherein fluid material is fed into said intake port and through said nozzle to fill said recesses and said groove adjacent said nozzle; and said machine includes means for creating relative movement between said exposed surface of said generally cylindrical forming die and said extrusion die, thereby, as said forming die rotates on said shaft, moving said filled recesses and said material in said groove away from said nozzle while moving empty recesses toward said nozzle, which in turn allows the material in said filled recesses and from the groove to cool and solidify to form the support surface and the bristles in-situ thereon.

2. The machine for producing bristles and a support surface for the bristles according to claim 1, wherein:

said forming die is comprised of a first outer section, a second outer section and a die section sandwiched between said outer sections, said die section having said plurality of recesses formed about its circumferential outer surface for forming a first desired bristle configuration; and one of said die section or said forming die can be replaced with a different corresponding die section or forming die to produce a second desired bristle configuration.

3. The machine for producing bristles and a support surface for the bristles according to claim 1, further comprising a source of pressurized air for directing an air stream at a point where the support surface and the bristles are released from said forming die, the air stream assisting in this release as well as helping to cool the support surface and the bristles.

4. The machine for producing bristles and a support surface for the bristles according to claim 3, wherein:

- the support surface extends beyond both sides of the outermost bristles;
- said machine further comprises a set of drive wheels for feeding the channel-shaped guide to a subsequent process;
- said set of drive wheels comprises a first top and bottom drive wheel for gripping and driving one side of the support surface and a second top and bottom drive wheel for gripping and driving the opposite side of the support surface.

5. The machine for producing bristles and a support surface for the bristles according to claim 4, further comprising a channel-shaped guide for aligning the bristles and the bristle support surface with said set of drive wheels and said forming die.

6. The machine for producing bristles and a support surface for the bristles according to claim 4, wherein:

- said machine further comprises a cutting knife; and
- the subsequent process comprises removing the bristles from the bristle support surface using said cutting knife.

* * * * *